United States Patent
Lee et al.

(10) Patent No.: US 6,584,081 B1
(45) Date of Patent: *Jun. 24, 2003

(54) METHOD AND APPARATUS FOR ELIMINATING INTERMODULATION INTERFERENCE IN CELLULAR TELEPHONE SYSTEMS

(75) Inventors: William Chien-Yeh Lee, Danville, CA (US); F. Craig Farrill, Danville, CA (US)

(73) Assignee: Cellco Partnership, Bedminster, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/377,443

(22) Filed: Aug. 19, 1999

Related U.S. Application Data

(63) Continuation of application No. 08/759,782, filed on Dec. 3, 1996, now Pat. No. 5,978,362.
(60) Provisional application No. 60/011,250, filed on Feb. 6, 1996.

(51) Int. Cl.[7] ............................. H04L 7/00; H04J 1/16
(52) U.S. Cl. ..................................... 370/315; 370/328
(58) Field of Search ............................... 370/315, 328, 370/317, 320; 455/446, 63, 426

(56) References Cited

U.S. PATENT DOCUMENTS

| | | |
|---|---|---|
| 3,484,560 A | 12/1969 | Jaeger et al. |
| 3,784,915 A | 1/1974 | Oswald et al. |
| 3,806,809 A | 4/1974 | Firman |
| 3,883,872 A | 5/1975 | Fletcher et al. |
| 4,041,389 A | 8/1977 | Oades |
| 4,144,411 A | 3/1979 | Frenkiel |
| 4,146,892 A | 3/1979 | Overman et al. |
| 4,150,334 A | 4/1979 | Williams |
| 4,249,257 A | 2/1981 | Campbell |
| 4,613,990 A | 9/1986 | Halpern |
| 4,704,734 A | 11/1987 | Menich et al. |
| 4,723,321 A | 2/1988 | Saleh |
| 4,727,590 A | 2/1988 | Kawano et al. |
| 4,764,979 A | 8/1988 | Noguchi et al. |
| 4,790,000 A | 12/1988 | Kinoshita |
| 4,914,651 A | 4/1990 | Lusignan |
| 4,977,376 A | 12/1990 | Schiek et al. |
| 5,056,109 A | 10/1991 | Gilhousen et al. |
| 5,058,199 A | 10/1991 | Grube |
| 5,200,955 A | 4/1993 | McFarlane et al. |
| 5,479,443 A | 12/1995 | Kagami et al. |
| 5,570,354 A | 10/1996 | Simon |
| 5,978,362 A * | 11/1999 | Lee et al. .................. 370/315 |
| 6,308,072 B1 * | 10/2001 | Labedz et al. ............. 455/446 |

* cited by examiner

Primary Examiner—Salvatore Cangialosi
(74) Attorney, Agent, or Firm—Gates & Cooper LLP

(57) ABSTRACT

The invention describes method and apparatus for reducing intermodulation interference caused by reception of undesired signals in wireless receivers. The apparatus comprises an antenna for receiving the desired signal, a low noise amplifier for amplifying this signal, an adjustable attenuator, and a transmitting antenna to transmit the amplified signal to the wireless receiver. By increasing the strength of the desired signal, the present invention eliminates intermodulation distortion caused by the undesirable signals. The invention also describes an apparatus further comprising an adjustable filter for limiting the spectral content of the transmitted amplified signal, and an apparatus for selecting the characteristics of the adjustable filter in accordance with the measured characteristics of the desired and undesired signals.

34 Claims, 3 Drawing Sheets

$f_1$ : CDMA SIGNAL (FORWARD) FROM CDMA CELL SITE $f_2$ : AMPS SIGNAL (FORWARD) (CAUSES IM IN CDMA MOBILE)

$f_{1R}$ : CDMA SIGNAL (FORWARD) FROM IM INTERFERENCE ELIMINATOR $f_2'$ : AMPS SIGNAL (REVERSE) FROM AMPS MOBILE (CAUSES IM AT CDMA CELL SITE)

METHOD AND APPARATUS FOR ELIMINATING INTERMODULATION INTERFERENCE IN CELLULAR TELEPHONE SYSTEMS

CROSS-REFERENCE TO RELATED APPLICATION

This application is a Continuation of application Ser. No. 08/759,782, filed Dec. 3, 1996, now U.S. Pat. No. 5,978,362 entitled 'METHOD AND APPARATUS FOR ELIMINATING INTERMODULATION INTERFERENCE IN CELLULAR TELEPHONE SYSTEMS', which application is incorporated herein by reference.

This application claims the benefit of U.S. Provisional Application Serial No. 60/011,250, entitled "ELIMINATION OF INTERMODULATION INTERFERENCE IN CELLULAR TELEPHONE SYSTEMS," by William Chien-Yeh Lee and F. Craig Farrill, filed Feb. 6, 1996, which application is incorporated by reference herein.

BACKGROUND OF THE INVENTION

1. Field of the Invention

This invention relates in general to methods and devices for reducing interference with wireless communications, and in particular, to a method and apparatus for reducing intermodulation interference in mobile cellular telephones.

2. Description of Related Art

Currently, much of the infrastructure for cellular telephone systems in the United States comprises AMPS (advanced mobile phone system) or analog-type cellular telephone systems. Next-generation CDMA (code division multiple access) cellular telephone systems are now being installed, often in parallel with AMPS cellular telephone systems. These CDMA cellular telephone systems rely on low power broadband spread spectrum transmission techniques. In most circumstances, CDMA and AMPS cellular systems can coexist without significant interference. However, recent experience has shown that interference between CDMA and the AMPS systems is possible under some circumstances. For example, when a CDMA mobile unit approaches an AMPS-only site, the AMPS signal overloads the CDMA mobile cellphone receiver radio frequency (RF) front-end circuits due to the relative strength of the AMPS signal and the relative weakness of the spread-spectrum CDMA signal. Intermodulation (IM) components created by the AMPS signal after low noise amplification (LNA) also interfere with the weak CDMA signal.

Efforts to curb this problem have focused on modifying the CDMA mobile units by the conventional method of adding attenuation pads and changing the range of LNA to reduce IM problems. Unfortunately, these changes are costly and difficult to implement because they rely on design changes to the mobile cellphones, which are large in number. Further, even where this technique has been used, it has not substantially improved reception quality.

Thus, there is a need for an inexpensive and effective system and method for eliminating intermodulation interference in cellular telephone systems.

SUMMARY OF THE INVENTION

To overcome the limitations in the prior art described above, and to overcome other limitations that will become apparent upon reading and understanding the present specification, the present invention discloses an apparatus for reducing AMPS-related interference received by a CDMA cellular telephone mobile receiver. The apparatus comprises a first antenna for receiving the CDMA signal, an interference-eliminating signal generator, and a second antenna for transmitting the interference-eliminating signal. The interference-eliminating signal generator comprises a signal processor and adaptive nuller for adaptively reducing the foreign signal and passing forward channel signals, a low noise amplifier and an attenuator. In one embodiment, the interference-eliminating signal generator further comprises a filter to shape the spectral content of the interference-eliminating signal. In another embodiment, the attenuator is adjustable, and can be adjusted according to the distance between the second antenna and the AMPS transmitter, or according to the measured amplitude of the AMPS receiver. The present invention also incorporates antenna adaptive techniques to null the foreign signal. Similarly, the method comprises the steps of receiving the CDMA signal, and processing the signal to pass the forward channel signals and reject the reverse channel signals, amplifying the signal, and transmitting the amplified CDMA signal to the mobile cellular telephone.

BRIEF DESCRIPTION OF THE DRAWINGS

Referring now to the drawings in which like reference numbers represent corresponding elements throughout.

DETAILED DESCRIPTION OF THE PREFERRED EMBODIMENT

In the following description of the preferred embodiment, reference is made to the accompanying drawings which form a part hereof, and in which is shown by way of illustration, a specific embodiment in which the invention may be practiced. It is to be understood that other embodiments may be used and changes may be made without departing from the scope of the present invention.

1. Overview

Figure 1:
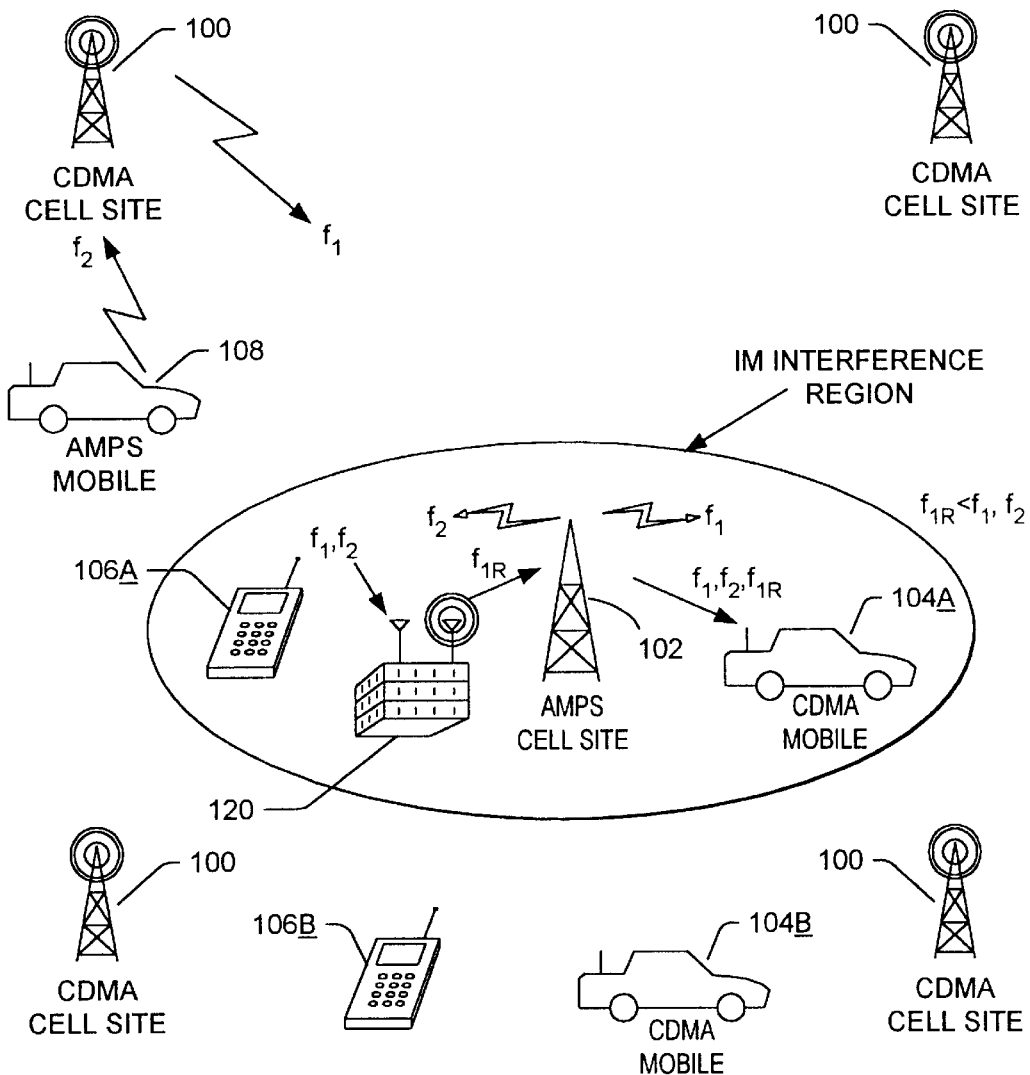
FIG. 1 is a diagram presenting an overview of key elements of the present invention.

FIG. 1 is a diagram showing the operation of the present invention. Currently, two types of cellular telephone systems are used in the United States. These include the advanced mobile phone system (AMPS), and the code division multiple access system (CDMA). The AMPS cellular telephone systems, which currently predominate, use an array of AMPS cell sites 102 to transmit a relatively high-power analog signal. CDMA cellular telephone systems rely on digital technology, and use an array of CDMA cell sites 100 to transmit and receive a low power, spread spectrum signal. Currently, two CDMA bands, Band A and Band B are authorized, and each has nine channels. Full duplex CDMA communications are provided by transmitting base transceiver to cellphone communications on a forward channel, and cellphone to base transceiver communications on a reverse channel covering a separate frequency spectrum.

In most circumstances, CDMA and AMPS cellular telephone systems coexist with little or no interference. This is due both to the inherent interference-resistant characteristics of the broadband spread spectrum communication techniques employed in the CDMA cellular telephone system and judicious selection of AMPS and CDMA broadcast frequencies.

The signals transmitted from AMPS sites can cause radio frequency (RF) front end interference of CDMA cellphones. For example, when a CDMA receiver such as CDMA handheld cellphone 106 or CDMA mobile cellphone 104 is located within IM interference region 108 (at position 106A or 104A respectively), the signal from AMPS cell site 102 can be strong enough to overload the RF front-end of the CDMA handheld cellphone 106 or CDMA mobile cellphone 104, causing sufficient intermodulation distortion to compromise the performance of the CDMA cellular telephone system. The shape and extent of the IM interference region 108 will depend on the CDMA cell site 100 signal, the AMPS cell site 102 signal, and the design of the CDMA handheld cellphone 106 or CDMA mobile cellphone 104. This problem is made worse by the fact that fewer CDMA cell sites 100 are needed in a given area due to the increased capacity of CDMA.

This intermodulation interference problem exists on both the forward and reverse channels. That is, an AMPS signal from an approaching AMPS mobile 108 can overload the RF front-end of CDMA cell sites 100 as well as CDMA handheld and mobile cellphones 106, 104. Similarly, CDMA handheld and mobile cellphones 106, 104 may be overloaded as they approach a transmitting AMPS cell site 102. Reverse channel intermodulation interference at the CDMA cell sites 100 caused by AMPS signals can be minimized using sharp filter skirts or by commanding increased transmitter signal output from the cellphones 104 and 106, using well known cellular telephone techniques. However, this solution cannot be used to reduce intermodulation interference in cellphones 104 and 106, because cellphones 104 and 106 are usually too small in size to accommodate sharp skirt filters. Further, this solution would require LNA dynamic ranges approaching or exceeding 80 dB, and LNAs capable of this performance level are prohibitively expensive.

Previous efforts to solve forward channel intermodulation interference problems have focused on making the CDMA handheld 106 and mobile 104 telephone RF front-ends more resistant to overload, and less vulnerable to the high amplitude AMPS signal. However, these techniques are expensive, difficult to implement, and do not solve interference problems with existing CDMA handheld 106 and mobile 104 cellphones.

Of course, additional, closely-spaced, CDMA cell sites 100 would reduce intermodulation interference, but this brute-force solution is unnecessarily complex and expensive because two-way, full-power transception capability is not required to eliminate IM distortion in the cellphones 104 and 106.

The present invention offers a simple, inexpensive solution to the IM interference problem, using an IM interference eliminator 120. The IM interference eliminator 120 processes received CDMA signals to reject foreign channel signals, and is designed to operate only on forward channel CDMA signals transmitted from the CDMA cell sites 100 to the CDMA handheld 106 or mobile 104 cellphones alone. Signals transmitted from the CDMA handheld 106 or mobile 104 cellphones to the CDMA cellular telephone system remain unaffected. By operating only on forward communication channels, the design of the IM interference eliminator 120 is dramatically simplified, resulting in effective performance at low cost.

2. IM Interference Eliminator Description

Figure 2:
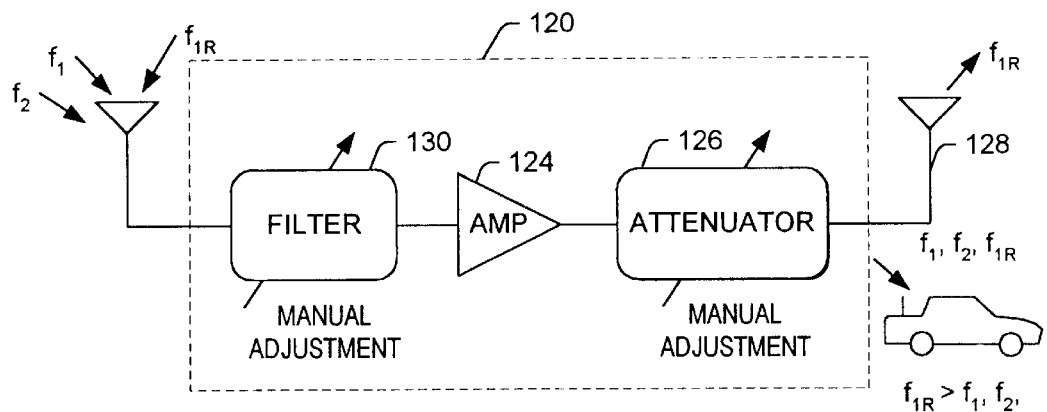
FIG. 2 is a block diagram of one embodiment of the present invention.

FIG. 2 is a block diagram of one embodiment of the IM interference eliminator 120. The IM interference eliminator 120 is an "F1F1" device, that is, the frequency of the received and transmitted signals are the same. The signals received and transmitted by the IM interference eliminator 120 are also largely steady signals, because the IM interference eliminator 120 is used only over the forward link (from the CDMA cell sites 100 to the CDMA mobile 104 and handheld 106 cellphones). Thus, the IM interference eliminator 120 can be implemented with simple, inexpensive, electronic hardware that can be mounted anywhere. In fact, the IM interference eliminator 120 should cost about $1000 or less, and should be no larger than a shoebox.

Ordinarily, the IM interference eliminator 120 is mounted at or proximate to the AMPS cell site 102 that is the source of the IM interference region 108, but may be used anywhere an external signal introduces IM distortion in a wireless transceiver, and mounted accordingly. Since the required transmitting power of the IM interference eliminator 120 is low, it may receive operating power from batteries or an integrated or external solar panel.

The IM interference eliminator 120 comprises a receiving antenna 122, coupled to a signal processor filter 130, an amplifier 124, and a transmitting antenna 128. The receiving antenna 122 receives transmitted signals (including forward CDMA signals, and AMPS signals). Filter 130, which is manually adjustable, reduces foreign signals received by the receiving antenna 122, and passes only forward channel signals. In one embodiment, filter 130 comprises a channel filter, which shapes the spectral content of the signals from the receiving antenna 122 to pass only forward channel signals.

Currently, CDMA signals are transmitted over two bands, A and B, each with nine channels, and only one (the primary channel) of the nine CDMA channels is in use. To reduce cost, the filter 130 may be set to pass only the primary forward CDMA channel. In another embodiment, the filter 130 may be set to cover selected CDMA forward channels in any combination, allowing more flexible and adaptable implementations to be produced.

Amplifier 124 is a low noise linear amplifier with a gain of up to 40 dB, operating in the CDMA frequency range. Of course, amplifier 124 gains in excess of 40 dB may be used, but because the signal received from the CDMA cell sites 100 is a steady signal, the amplifier 124 gain characteristic need only be linear over a 20 dB range to accommodate the forward power control variation. The CDMA signal is received by the receiving antenna 122, is filtered and amplified by the amplifier 124. This signal is then transmitted by the transmitting antenna 128, and received by the CDMA mobile 104 and handheld 106 cellphones.

In one embodiment, the IM interference eliminator 120 also comprises an adjustable attenuator 126 to attenuate the amplified signal. Adjustable attenuator 126 is adjusted to assure that the transmitted CDMA signal power is limited to that which is necessary to reduce IM interference for CDMA mobile 104 and handheld 106 cellphones within the IM interference region 108. This adjustment capability may be implemented separately or in the amplifier 124, and may also account for any combination of the separation between the CDMA cell site 100 and the IM interference eliminator 120, the strength of the CDMA and/or AMPS signals received at the IM interference eliminator 120, or the distance from the transmitting antenna 128 to the AMPS cell site 102.

In one embodiment, the filter 130, either separately or in combination with the channel selecting capabilities described above, comprises a notch filter tuned to the frequency of signal from the AMPS cell site 102. This allows the impact of unwanted in-CDMA-band signals such as the narrow band AMPS signal to be minimized before amplification and transmission to the CDMA mobile 104 or handheld 106 cellphones. This notch filter can be expensive and physically too large to be implemented in the CDMA mobile 104 or handheld 106 cellphones. By placing the filter in the IM interference eliminator 120, the present invention provides performance improvement without incurring these additional costs or size constraints.

Figure 3:
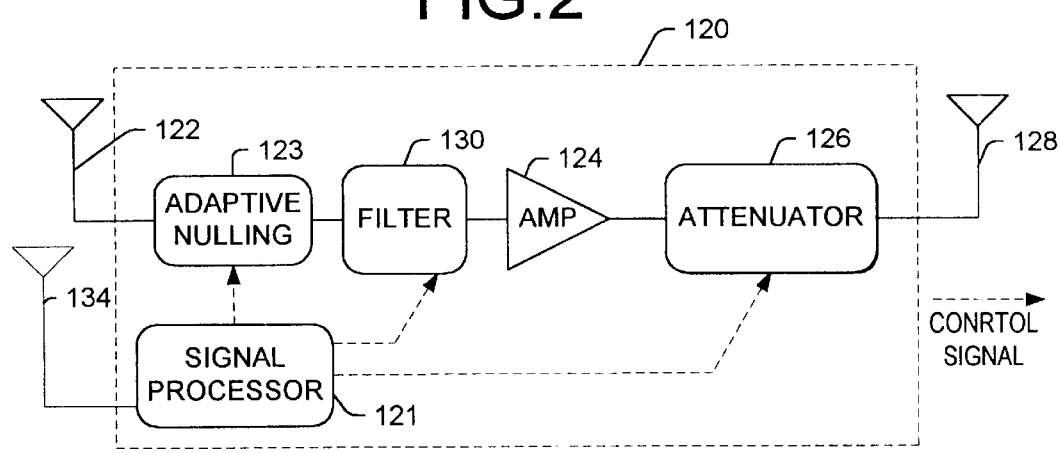
FIG. 3 is a block diagram of a second embodiment of the present invention incorporating signal processor and an adaptive nuller.

FIG. 3 presents another embodiment of the IM interference eliminator 120, wherein the characteristics of the IM interference eliminator 120 can be selected according to the measured signal characteristics of the signal from the CDMA cell sites 100 and/or the AMPS transmitters 102. These signal characteristics can be measured by an external source, or within the IM interference eliminator 120 by signal processor 121, using a signal provided by the receiving antenna 122 or secondary antenna 134. Signal processor 121 is capable of measuring parameters of the signals from the CDMA cell sites 100, signals from the AMPS cell sites 102, signals from other sources, and background noise. Measured parameters include the power, amplitude, and spectral content of the received signals, but may include other parameters as well, singularly, or in any combination without departing from the scope of the present invention. For example, the receiving antenna 122 may be an array antenna, providing the signal processor 121 with additional information from which to derive the control signals, such as angular information from the received signal. This information can be used to allow the adaptive nuller 123 to further optimize the IM interference eliminating signal.

In this embodiment, the IM interference eliminator 120 further comprises an adaptive nuller 123 coupled between the receiving antenna 122 and the filter 130. Signal processor 121 generates control signals for the adaptive nuller 123, the filter 130, and the attenuator 126. These control signals allow adjustment of the adaptive nuller 123, filter 130, and attenuator 126 in any combination to optimally reject any unwanted signals received by the receiving antenna 122, and to transmit the optimum IM interference eliminating signal via the transmitting antenna 128. These adjustments may be performed once, on a periodic basis, continuously, or automatically or upon command from the CDMA cell sites 100 or other command sources. Further, this process may be implemented by a variety of techniques. For example, the signal processor 121 may be an analog power measurement device which supplies a voltage or current proportioned to the measured power to the filter 130 and/or antennae 122, 134. Or, the signal processor 121, filter 130, and attenuator 126 may be individually or all digitally implemented in a microprocessor or computer. All of these embodiments are within the scope of the present invention.

For example, in one embodiment, the signal processor 121 measures the power and spectral content of the signal from the AMPS cell site 102, and adjusts the bandpass characteristics of the filter 130 to remove these components before low noise amplification. In another embodiment, the attenuation of the attenuator 126 is selected according to the power and spectral content of the AMPS cell site 102 signal. To optimize the IM interference eliminating signal, both the attenuation of the attenuator 126 and the characteristics of the filter 130 may be adjusted according to commands from the signal processor 121.

Figure 4:
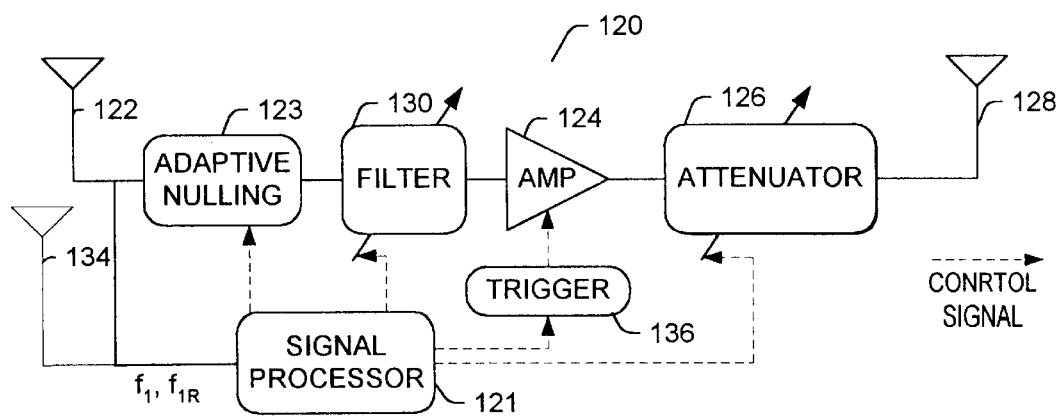
FIG. 4 is a block diagram of a third embodiment of the present invention, incorporating a trigger.

FIG. 4 presents another embodiment of the present invention, incorporating a trigger 136 coupled between the signal processor 121 and the amplifier 124. The trigger 136 detects whether an active CDMA forward channel signal has been received by the IM interference eliminator 120. If a signal has been received, the trigger sends a command signal to enable the amplifier 124. This prevents the IM interference eliminator 120 from transmitting signals when no input $f_1'$ is found or amplification is not required, thereby saving power and preventing unwanted interference. This feature is particularly useful for solar or battery powered devices which are implemented in remote locations. Different triggering schemes are employed depending on the needs of the particular installation. In one embodiment, trigger 136 enables the amplifier 124 when the trigger detects a CDMA signal of a minimum amplitude or power threshold. In another embodiment, trigger 136 enables the amplifier only when the forward channel CDMA signal is above the noise floor, but below a threshold amplitude or power value. This embodiment prevents operation of the IM interference eliminator 120 in situations where the CDMA forward channel signal is of sufficient amplitude that no intermodulation distortion is expected to be created in CDMA handheld cellphone 106 or CDMA mobile cellphone 104. Trigger 136 can also enable the amplifier when the CDMA forward channel amplitude is between a minimum and a maximum threshold value or when a nearby AMPS signal is detected, and can be used with the signal processor 121 to implement other triggering schemes.

Figure 5:
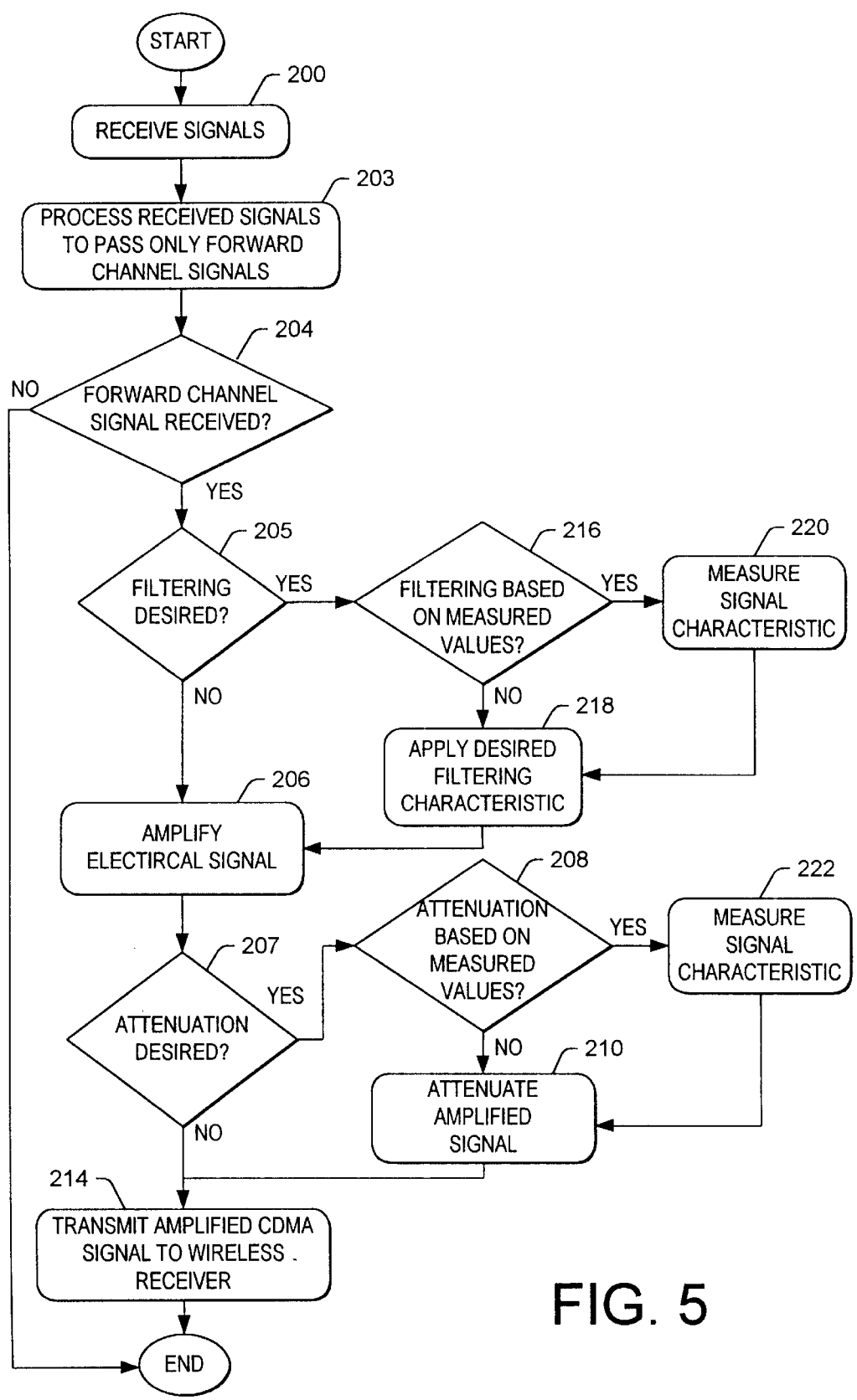
FIG. 5 is a flowchart illustrating the operation of the present invention.

FIG. 5 presents a flowchart describing a method of reducing IM interference. The process begins in block 200 by receiving the CDMA signal from the CDMA cell site 100. This signal processed in block 203 to pass only forward channel signals and reject reverse channel signals. As shown in block 204, if no CDMA forward channel signal is received, IM interference eliminating operation is not required, and the process ends, without activating the amplifier 124. If a CDMA forward channel signal is received and IM interference eliminating is required, the process continues.

If filtering of the signal is not desired 205, the signal is amplified, as depicted in block 206. Thereafter, if no attenuation is desired, the amplified CDMA signal is transmitted to the CDMA mobile 104 or handheld 106 cellphones, as depicted in block 214.

If filtering of the signal is desired, the desired filtering characteristic is determined and applied as shown in blocks 216, 218, and 220. Filtering may be based on measured values, as depicted in blocks 220 and 218, or on other selected criteria, which may be pre-selected or controlled from an external source.

If attenuation of the signal is desired 207, the attenuation value is determined and applied as depicted in blocks 208, 222, and 210. If the desired attenuation is based on measured values, whether of the AMPS or other external signal, the selected value is measured and the attenuation value derived therefrom is applied to the signal, as depicted in blocks 222 and 210, respectively. The attenuation value may be selected from other criteria, such as the distance from the IM interference eliminator 120 to the AMPS cell site 102. In these cases, the attenuation value is simply applied to the signal.

The present invention describes a wideband wireless device which reduces or mitigates intersystem interference. While the present invention has been described with respect to reduction of IM interference in CDMA systems, it will be noted by those skilled in the art that the present invention can be applied to any wireless communication system, including Group of Special Mobiles (GSM), Advanced Mobile Phone Service (AMPS), Total Access Communication System (TACS), Americal Digital Cellular (ADC), including North American TDMA (ND-TDMA) and North American CDMA (NA-CDMA) and others, as long as the undesired signal may overload the mobile units and cause IM interference. The IM interference eliminator can be applied to different frequencies and other systems as well, such as Personal Communications Service (PCS), and Digital European Cordless Telecommunication Systems (DECT).

3. Conclusion

This concludes the description of the preferred embodiment of the invention. In summary, the present invention describes an apparatus for reducing interference between a first signal received and a second signal transmitted by a foreign or external wireless transceiver. The apparatus comprises a first antenna for receiving the first signal, an interference eliminator, and a second antenna. The interference eliminator comprises filter optimally controlled by a signal processor to eliminate foreign (AMPS) signals, an amplifier and an attenuator. In one embodiment, the invention also comprises an adjustable attenuator. The present invention also describes a method of reducing intermodulation interference in a wireless receiver, comprising the steps of receiving a first signal, amplifying the first signal, attenuating the amplified first signal, and transmitting the attenuated signal from a second antenna to the wireless transceiver.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus for reducing intermodulation interference from an external signal transmitted from an external transmitter, comprising:
    a first antenna for receiving signals comprising duplex communications having a forward channel signal transmitted over a forward channel from a base transceiver and a reverse channel signal transmitted over a reverse channel by a wireless transceiver;
    a signal generator, coupled to the first antenna, comprising a filter for passing the forward channel signal and for rejecting reverse channel signal, and an amplifier, coupled to the filter, for amplifying the filtered signal;
    a second antenna, coupled to the amplifier, for transmitting the amplified and filtered signal to the wireless transceiver to reduce intermodulation interference in the wireless transceiver from the external signal; and
    wherein the second antenna is disposed proximate to the external transmitter.

2. The apparatus of claim 1, further comprising an attenuator, coupled between the amplifier and the second antenna, for reducing the amplitude of the amplified filtered signal.

3. The apparatus of claim 2, wherein the attenuator is an adjustable attenuator.

4. The apparatus of claim 3, wherein the adjustable attenuator is adjusted according to a distance from the external transmitter to the second antenna.

5. The apparatus of claim 1, wherein the filter is adjustable to shape the spectral content of the received signals.

6. The apparatus of claim 5, wherein the adjustable filter is a notch filter tuned to reject the external signal.

7. The apparatus of claim 5, further comprising an adjustable attenuator coupled between the amplifier and the second antenna and wherein the apparatus further comprises a signal processor coupled to the receiving antenna, the adjustable attenuator, and the adjustable filter, the signal processor for providing a control signal to the adjustable filter and the adjustable attenuator based on a characteristic of the external signal.

8. The apparatus of claim 7, wherein the external signal characteristicis selected from a group comprising external signal power and external signal spectral content.

9. The apparatus of claim 7, further comprising an adaptive nuller responsive to a command signal from the base transceiver, the adaptive nuller coupled between the first antenna and the filter, the adaptive nuller for modifying the received signals according to the control signal from the signal processor.

10. The apparatus of claim 7, further comprising a trigger coupled to the amplifier, the trigger providing a trigger signal in response to a command signal from the signal processor.

11. The apparatus of claim 10 wherein the signal processor provides a command signal to the trigger when a forward channel signal is detected.

12. A method of reducing intermodulation interference from an external signal received from an external transmitter, comprising the steps of:
    receiving signals comprising communications from the base transceiver, the duplex communications comprising a forward channel signal transmitted over a forward channel by a base transceiver and a reverse channel signal transmitted over a reverse channel by a wireless receiver;
    filtering the received signals to pass the forward channel signal and to reject the reverse channel signal;
    amplifying the filtered signal; and
    transmitting the filtered and amplified signal to the wireless transceiver from an antenna disposed proximate to the external transmitter to reduce intermodulation interference in the wireless transceiver from the external signal.

13. The method of claim 12, further comprising the step of attenuating the filtered and amplified signals.

14. The method of claim 13, further comprising the step of determining a distance from the external transmitter to the antenna used to transmit the filtered and amplified received signals, and attenuating the filtered and amplified received signals according to the distance from the external transmitter to the antenna.

15. The method of claim 12, further comprising the steps of:
    measuring the power of the external signal; and
    attenuating the filtered and amplified signal according to the measured power of the external signal.

16. The method of claim 12, further comprising the steps of:
    measuring the spectral content of the external signal; and
    filtering the received signals according to the measured spectral content of the external signal.

17. The method of claim 12, wherein the step of processing the received signal to pass the forward channel signals and to reject the reverse channel signals comprises the step of filtering the received signals to pass only the forward channel signals.

18. The method of claim 12, wherein the amplifying step is performed only when a forward channel signal is present.

19. The method of claim 12 wherein the amplifying step is performed only when an external signal is detected.

20. A system for reducing intermodulation interference in a wireless receiver during reception of a first signal, comprising:
- a first antenna for receiving a first signal from a first source and an interfering second signal from a second source having a location relative to the first source defining an interference region;
- a filter for passing the first signal and for rejecting the second signal, coupled to the first antenna;
- an amplifier, coupled to the filter, for amplifying the filtered signal; and
- a second antenna, coupled to the amplifier, and located within the interference region, for transmitting the amplified and filtered first signal to the wireless receiver to reduce interference in the wireless receiver caused by the second signal.

21. The system in claim 20, wherein the filter is a notch filter tuned to substantially reject the second signal.

22. The system in claim 20, wherein the second signal is stronger than the first signal.

23. The system in claim 20, wherein the first source is a first cellular telephone transmitter for transmitting a desired signal.

24. The system in claim 20, wherein the second source is a second cellular telephone transmitter for transmitting an undesired signal.

25. The system in claim 2, wherein the wireless receiver is a cellular telephone receiver.

26. An apparatus for reducing intermodulation interference in a wireless receiver during reception of a first signal transmitted by a first source in the presence of a second signal transmitted by a second source, wherein a relationship between the first source and the second source describe an interference region, comprising:
- a first antenna;
- a filter for passing the first signal and rejecting the second signal, the filter coupled to the first antenna;
- an amplifier, coupled to the filter, for amplifying the filtered signal; and
- a second antenna, coupled to the amplifier, and disposed within the intermodulation interference region, for transmitting the amplified and filtered signal to the wireless receiver to reduce interference in the wireless receiver from the second signal.

27. The apparatus in claim 26, wherein the filter is a notch filter tuned to reject the second signal.

28. The apparatus in claim 26, wherein the second signal is stronger than the first signal.

29. The apparatus in claim 26, wherein the first source is a cellular telephone transmitter for transmitting a desired signal.

30. The apparatus in claim 26, wherein the second source is a cellular telephone transmitter for transmitting an undesired signal.

31. The apparatus in claim 26, wherein the wireless receiver is a cellular telephone receiver.

32. A method for reducing interference in a wireless receiver during reception of a first signal transmitted by a first source in a first location in the presence of a second signal transmitted by a second source in a second location, wherein a relationship between the first source and the second source defines an interference region, comprising the steps of:
- receiving the first signal and the second signal;
- filtering the received first signal and the received second signal, to substantially pass the first signal and substantially reject the second signal;
- amplifying the filtered signal; and
- transmitting the filtered and amplified signal from within the interference region.

33. The apparatus of claim 5, wherein the filter is adjusted according to a characteristic of the external signal.

34. The apparatus of claim 10, wherein the signal processor provides the command signal to the trigger when the external signal is detected.

* * * * *

UNITED STATES PATENT AND TRADEMARK OFFICE
CERTIFICATE OF CORRECTION

PATENT NO.     : 6,584,081 B1
DATED          : June 24, 2003
INVENTOR(S)    : William Chien-Yeh Lee and F. Craig Farrill It is certified that error appears in the above-identified patent and that said Letters Patent is hereby corrected as shown below:

Column 9,
Line 36, "2" should read -- 20 --

Signed and Sealed this

Eighteenth Day of November, 2003

JAMES E. ROGAN
*Director of the United States Patent and Trademark Office*